United States Patent [19]

Ryan et al.

[11] 4,276,037
[45] Jun. 30, 1981

[54] LOAD RESPONSIVE DRIVE MECHANISM

[75] Inventors: Edward C. Ryan, Ankeny; Jimmy J. Parker, Des Moines, both of Iowa

[73] Assignee: Deere & Company, Moline, Ill.

[21] Appl. No.: 32,488

[22] Filed: Apr. 23, 1979

[51] Int. Cl.³ .................... F16H 5/54; F16H 11/00; F16D 47/04
[52] U.S. Cl. .................. 474/70; 74/336 B; 74/337; 192/48.92
[58] Field of Search .............. 74/217 R, 337, 336 R, 74/335, 336 B; 192/48.3, 48.1, 54, 48.92; 474/70, 73, 74

[56] References Cited

U.S. PATENT DOCUMENTS

| | | | |
|---|---|---|---|
| 541,040 | 6/1895 | Crandall | 74/337 |
| 2,187,835 | 1/1940 | Martin | 192/48.3 |
| 2,230,293 | 2/1941 | Harris | 74/217 R |
| 2,463,100 | 3/1949 | Gredell | 192/48.3 |
| 2,694,937 | 9/1950 | Birbaum | 192/48.3 |
| 2,772,576 | 1/1955 | Ross | 74/337 |
| 2,809,535 | 10/1957 | Hein et al. | 74/217 R |

Primary Examiner—Allan D. Herrmann

[57] ABSTRACT

A drive mechanism having drive and driven shafts for automatically providing increased torque when the loading on the driven shaft is increased beyond a predetermined limit, for example upon start-up of a loaded conveyor. The shafts are interconnected by a pair of sprockets and chain drive assemblies of differing ratios. Under normal loading the output shaft is driven through a friction clutch by the sprocket and chain drive assembly providing the highest output speed. Under heavy loading, the friction clutch begins slipping and a one-way clutch is activated to drive the output shaft through the lower speed sprocket and chain drive assembly.

1 Claim, 3 Drawing Figures

LOAD RESPONSIVE DRIVE MECHANISM

BACKGROUND OF THE INVENTION

The present invention relates generally to a drive mechanism and more specifically to a drive mechanism for providing automatic torque amplification under high loading.

A gear or pulley arrangement is commonly used to transmit drive from an input shaft to an output shaft connected to a load. Often the load can vary considerably, altering torque requirements to drive the output shaft. In many applications, high torque may only be necessary a relatively short period of time to overcome a temporary overload condition. For example, when the driven shaft is connected to the unloading chain of an implement such as a stack wagon for hay, the starting torque necessary to begin the load moving is much higher than that required to convey the load out once it begins to move.

Transmissions are available which shift automatically to vary the relationship between the input and output shaft speed such as shown in U.S. Pat. No. 3,436,977, but these are generally responsive to engine or shaft speed and require a relatively complex centrifugal or roller clutch which is difficult and expensive to manufacture. Other transmission devices similar to that shown in U.S. Pat. No. 1,143,048 are less complex but do not shift automatically.

SUMMARY OF THE INVENTION

It is therefore an object of the present invention to provide a relatively simple and inexpensive drive mechanism which automatically increases torque output when heavy loading is encountered.

It is a further object to provide a drive mechanism which automatically provides a high torque output if the torque required for driving the load exceeds a predetermined limit. It is still another object to provide such a drive mechanism which automatically reverts to normal speed when the torque requirement falls below the predetermined limit.

It is a further object of the invention to provide a drive mechanism for a conveyor, such as a material unloader on an implement, which drives the conveyor at one speed when it is operating under normal load and which drives the conveyor at a slower speed and with higher torque when a heavy load is encountered, for example upon start-up of the conveyor.

It is yet another object to provide a relatively simple and inexpensive drive mechanism with a torque amplifier which operates automatically to overcome intermittent or infrequent drive overloads.

In accordance with the above, a first sprocket is fixed for rotation with a drive shaft. A second sprocket is mounted on the drive shaft and operably connected thereto by a one-way clutch. A third sprocket is mounted for rotation with respect to a driven shaft and is connected through a friction clutch to a fourth sprocket which rotates with the driven shaft. Drive chains are trained between the first and third sprockets, and between the second and fourth sprockets. The ratio of the third to the first sprocket sizes is less than that of the fourth to the second. Under normal loads the first and third sprockets drive the output shaft through the friction clutch, and the fourth sprocket drives the second sprocket at a higher speed than the drive shaft causing the one-way clutch to overrun. When the output shaft is heavily loaded, the friction clutch slips and the one-way clutch operates to drive the fourth sprocket with the second at a lower speed and higher torque. As the load is reduced, the friction clutch stops slipping and the output shaft is again driven by the first and third sprockets.

The device is simple and inexpensive to manufacture, requiring relatively few parts, and operates automatically both to increase torque on heavy output loading and then to resume normal operating speed when the loading is reduced. Torque amplification is easily determined by the sprocket ratios for the two sprocket and chain drive assemblies, and the loading at which the lower speed sprocket and chain drive is activated depends upon the friction clutch setting.

These and other objects, advantages and features of the present invention will become apparent from the description of the preferred embodiment and from the drawings.

DESCRIPTION OF THE PREFERRED EMBODIMENT

Figure 1:
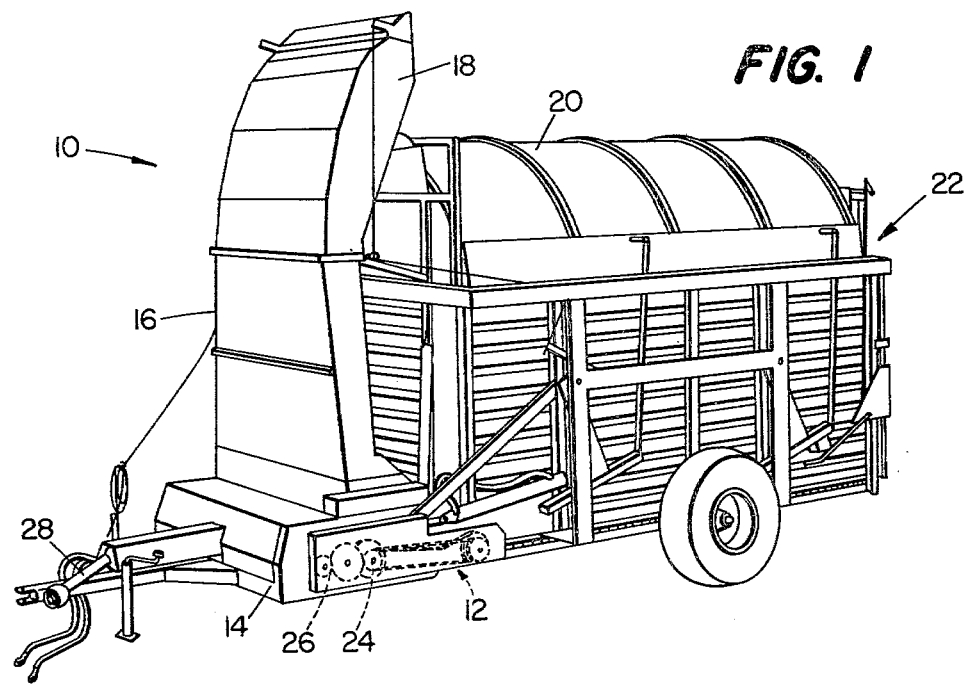
FIG. 1 is a perspective view of a stack wagon with the drive mechanism of the present invention incorporated therein.
Figure 2:
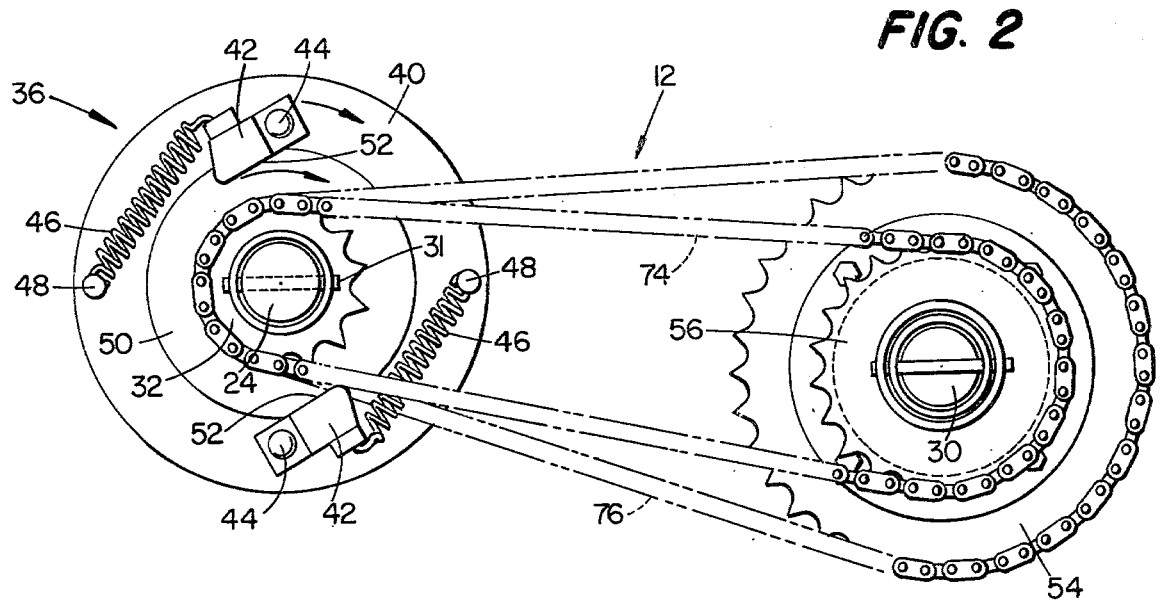
FIG. 2 is a side view of the drive mechanism shown in FIG. 1.
Figure 3:
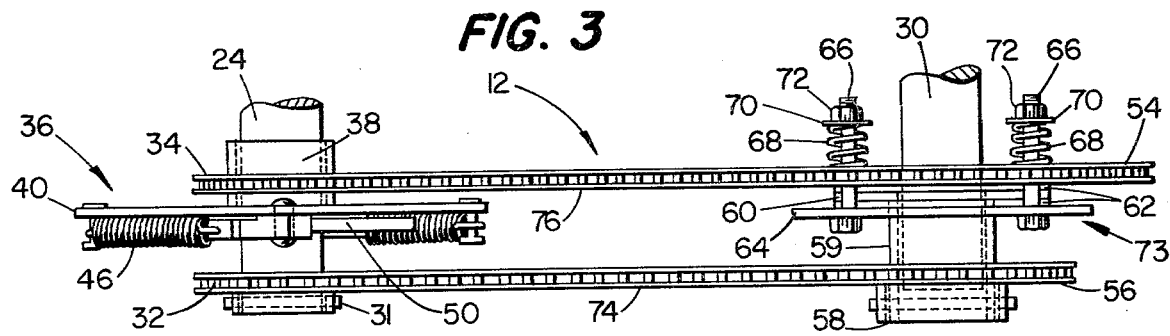
FIG. 3 is a top view of the drive mechanism shown in FIG. 2.

Referring now to FIGS. 1-3, a stack wagon 10 is shown with the drive mechanism 12 of the present invention. The stack wagon includes a pickup 14 for removing windrowed hay from the ground and directing it to a conveyor 16 and through a crop deflector 18 into the wagon where a canopy 20 compresses the hay into a stack. In the bottom of the wagon 10, there is an unloading drag chain with transverse slats (not shown) driven by the drive mechanism 12 for moving the entire stack out of a rear gate 22. An input shaft 24 of the drive mechanism 12 is driven in a conventional manner by gearing 26 operably connected to a power take-off shaft 28 which can be connected to a power take-off of a tractor. The drive mechanism 12 includes an output shaft 30 which carries a pair of sprockets (not shown) which drive the unloading log chain. Fixed to the input shaft 24 on the outer end thereof by a pin 31 is a first sprocket 32. A second sprocket 34 is mounted on the shaft inwardly of the first sprocket 32 and is connected to the shaft by a one-way clutch mechanism 36. The hub 38 of the sprocket 34 is connected to a dog plate 40. The dog plate 40 carries a pair of dogs or pawls 42 connected to the plate by pivots 44 and biased inwardly by springs 46 connected to the dogs and to the plate by pins 48. A ratchet wheel 50 is pinned or welded to the input shaft 24 adjacent and parallel to the dog plate 40. The ratchet wheel 50 includes a pair of teeth 52 and inclined so that the dogs or pawls 42 will ride over the ratchet wheel when the dog plate is rotated in the clockwise direction (FIG. 2) at an angular velocity greater than the velocity of the ratchet wheel 50. As the ratchet wheel 50 begins to rotate faster than the plate 40 in the clockwise direction, the pawls 42 engage the teeth 52 and cause the dog plate 40 and the second sprocket 34 to rotate in unison with the ratchet wheel 50 and the shaft 24.

Connected to the output shaft for rotation therewith is a large sprocket 54 which is algined with the second sprocket 34. A medium sized sprocket 56 includes a hub 58 pinned to a hub 59 of a circular plate member 60 which is parallel to the large sprocket 54. The sprocket 56, hubs 58 and 59, and plate member 60 are connected together and can rotate with respect to the outout shaft 30. A pair of friction plates are located on either side of the plate member 60. A pressure plate 64 is carried on the large sprocket 54 by a plurality of bolts 66 which extend through aligned openings in the pressure plate 64 and sprocket 54 and have their headed ends engaging the pressure plate. Compression springs 68 are positioned on the bolts 66 and are clamped between the large sprocket and washers 70 and nuts 72 on the bolts. The springs 68 urge the pressure plate 64 and the sprocket 54 toward each other, sandwiching the plate member 60 and the friction plates 62 therebetween. The assembly thus forms a friction clutch indicated generally at 73 which frictionally connects the medium sprocket 56 with the output shaft 30 via the large sprocket 54.

A first chain 74 is trained between the first sprocket 32 and the medium sprocket 56. A second chain 76 is trained between the second sprocket 34 and the large sprocket 54. In the preferred embodiment, the sprocket 32 and the sprocket 34 are approximately the same size, and the ratio of the medium sprocket 56 to the first sprocket 32 is smaller than the ratio of the large sprocket 54 to the second sprocket 34, the latter ratio being determined by the amount of torque amplification desired. The nuts 72 on the bolts 66 are tightened against the springs 68 such that under normal loading of the output shaft 30 the friction clutch 73 will not slip. As the drive shaft 24 is rotated, the medium sprocket 56 is driven by the first sprocket 32 and the first chain 74. The output shaft 30, connected to the medium sprocket 56 by the friction clutch 73, rotates at the same velocity as the sprocket 56. The large sprocket 54 which is connected directly to the shaft 30 rotates therewith driving the second sprocket 34 through the second chain 76 at a greater angular velocity than the first sprocket 32. The one-way clutch mechanism 36 therefore overruns (FIG. 2) as the dog plate 40 is rotated in the clockwise direction faster than the ratchet wheel 50. If the output shaft 30 is loaded beyond a preselected limit as determined by the compression of the springs on the bolts 66, the friction clutch begins to slip and the output shaft speed and therefore the speed of the large sprocket 54, decreases. The second sprocket 34 slows accordingly until the angular velocity of the dog plate 40 connected thereto decreases to a level below that of the shaft 24 and of the ratchet wheel 50 at which point the pawls 42 engage the teeth 52 causing the plate 40 and the ratchet wheel 50 to rotate in unison, driving the large sprocket 54 through the second sprocket 34 and the second chain 76. The output shaft 30 is thereby driven at a slower speed and with a higher torque when the friction clutch 73 is slipping. As the loading on the output shaft 30 is decreased, the friction clutch stops slipping and the output shaft is driven through the first sprocket 32, the first chain 74, and the medium sprocket 56 at a greater angular velocity because of the ratio of the sprocket sizes. The sprocket ratios are chosen to provide the desired amount of torque amplification upon heavy output shaft loading, and the adjustment of the compression of the springs on the bolts 66 determines the loading at which the friction clutch begins to slip.

In operation, the stack wagon 10 is loaded with hay which is compressed to form a compact stack by the canopy 20. The rear gate 22 is opened and the unloading chain with the transverse slats on the bottom of the wagon is operated through the drive mechanism 12 to move the stack rearwardly out of the wagon. Initially there is a considerable amount of friction which must be overcome to begin the stack of hay moving rearwardly, particularly when the hay is wet and heavy or when the stack has been left in the wagon too long. As the drive shaft 24 is rotated, the sprocket 32 drives the chain 74 which in turn rotates the sprocket 56 connected through the friction clutch 73 to the output shaft 30. If the initial loading is too great, the friction clutch begins to slip and the second sprocket 34 driven by the large sprocket 54 through the chain 76 slows or stops so the shaft 24 is rotating at a greater angular velocity than the sprocket 34. The one-way clutch mechanism 36 is then activated and the pawls 42 engage the teeth 52 of the ratchet wheel 50 forcing the second sprocket to rotate at the same speed as the drive shaft 24. The output shaft 30 is then driven by the large sprocket 54 through the chain 76 and the second sprocket 34. The output shaft 30 is thus driven at a lower speed and with higher torque than if driven by the medium sprocket 56 through the friction clutch. As the loading on the output shaft 30 decreases, for example when the load in the wagon begins to move and the friction decreases somewhat, the friction clutch 73 stops slipping and the output shaft 30, driven by the first sprocket 32 through the first chain 74 and the medium sprocket 56, rotates at the higher speed determined by the sprocket ratios. The large sprocket 54 then rotates the second sprocket 34 through the second chain 76 at an angular velocity greater than the velocity of the shaft 24 causing the one-way clutch to overrun.

Therefore, it is evident from the above that a relatively simple torque responsive drive mechanism is provided which automatically drives the output shaft at a slower speed and with higher torque when the loading is increased beyond a predetermined limit and which automaticaly reverts back to normal speed operation when the loading is reduced. The device is particularly useful where intermittent or infrequent drive overloads occur, for example, on initial start-up of a loaded conveyor.

Having described and illustrated a preferred embodiment of the invention, various modifications within the spirit and scope of the invention will become apparent to those skilled in the art and can be made without departing from the underlying principles of the invention. For example, the sprocket and chains could be replaced by belts and pulleys. The friction clutch 73 could be connected to the shaft 30 through a trunnion assembly to facilitate clutch alignment. The input shaft 24 or the output shaft 30 could also be the hub of a pulley or gear or the like. Therefore, the invention should not be limited to the specific embodiment described and illustrated, but should be commensurate with the proper scope of the followng claims.

We claim:

1. A drive mechanism comprising: input and output shafts journaled for rotation about parallel axes, a first drive wheel fixed for rotation with the input shaft, a second drive wheel rotatably mounted on the second shaft and aligned with the first drive wheel, a third drive wheel mounted on the input shaft adjacent the first drive wheel, overrunning clutch means supported between the first and third drive wheels for constraining the third drive wheel and input shaft to rotate in unison in one direction, a fourth drive wheel supported on the output shaft for rotation in unison therewith adjacent the second drive wheel, a friction surface located between the second and fourth drive wheels and fixed for rotation with the fourth drive wheel, said friction surface lying in a plane perpendicular to the output shaft, said plane intersecting the overrunning clutch means, a plate member fixed for rotation with the second drive wheel and supported adjacent and parallel to the friction surface between the second and fourth wheels, means for drivingly connecting the first and second drive wheels, means for drivingly connecting the third and fourth drive wheels, means biasing the friction surface against the plate member and frictionally connecting the second and fourth drive wheels for driving the output shaft from the second drive wheel and causing the fourth drive wheel to drive the third drive wheel so the clutch means overruns when loading on the output shaft is below a predetermined level, an for providing relative rotation between the second and fourth drive wheels when the loading is above the preselected level and causing the third drive wheel to rotate in unison with the input shaft to drive the fourth drive wheel.

* * * * *